United States Patent [19]

Rizkalla et al.

[11] Patent Number: 5,588,369
[45] Date of Patent: Dec. 31, 1996

[54] PASSIVE STABILIZATION PLATFORM

[75] Inventors: Emad Rizkalla; David Newbury, both of St. John's, Canada

[73] Assignee: Zedd Technologies Inc., St. John's, Canada

[21] Appl. No.: 241,858

[22] Filed: May 12, 1994

[51] Int. Cl.$^6$ ........................................................ A47F 5/12
[52] U.S. Cl. ................................................ 108/2; 114/195
[58] Field of Search ............................ 108/2; 114/191, 114/193, 194, 195, 192

[56] References Cited

U.S. PATENT DOCUMENTS

| | | | |
|---|---|---|---|
| 1,124,906 | 1/1915 | Ingeman et al. | 114/195 |
| 1,248,797 | 12/1917 | Booth | 114/195 |
| 2,408,169 | 9/1946 | Hoffer | 114/191 |

*Primary Examiner*—Peter M. Cuomo
*Assistant Examiner*—Gerald A. Anderson
*Attorney, Agent, or Firm*—Marcus & Associates

[57] ABSTRACT

A passive stabilizing platform is provided herein. It includes a base and at least two, but preferably three, vertically-upright hollow legs equi-angularly disposed around the the base. When in use the hollow legs contain a column of liquid therein. Tubes interconnect the hollow legs to allow free unimpeded movement of the water therebetween. A spherical float member is disposed in each of the hollow legs, the float member being movable only vertically upwardly or vertically downwardly within the hollow cylindrical leg within which the spherical float member is disposed, the movement being dependent solely, and in conjunction with, the upper surface of water in the hollow cylindrical leg within which the float member is disposed. A support arm is fixed to each float member and extends upwardly therefrom. The platform is supported by the support arms. A joint is secured between the hollow cylindrical legs and the platform. A depending vertical shaft is rigidly secured to the platform, and a counterweight hangs on the depending vertical shaft below the joint. In this manner, the passive stabilizing platform compensates for the effects of rolls, pitches, yaws, vibrations and accelerations simultaneously, to keep the platform level in the "X" and "Y" axes at all times.

4 Claims, 3 Drawing Sheets

PASSIVE STABILIZATION PLATFORM

2) BACKGROUND OF THE INVENTION (i) Field of the Invention

This invention relates to a passive stabilizing platform.

(ii) Description of the Prior Art

There are many instances where a device is to be held stable in an unstable environment, e.g., at sea. For example, a platform which supports an antenna on a boat should be maintained on its spatial orientation. Other instances where spatial orientation should be maintained include the following: radar devices, sensitive computer hardware and other electronic equipment.

Stabilizers are now known for a ship or an airline which consists of a continuously-driven gyroscope spinning about a vertical axis and pivoted so that its axis of spin may be tipped fore-and-aft in the vertical plane and that serve to oppose side ways motion. Also known are stabilized platforms floating on a body of water provided with downwardly-depending, open bottom cylindrical legs into which water flows to the level of the body of water. However, neither such gyrostabilizer, nor such stabilized platform are suitable for maintaining a platform in its spatial orientation to compensate for roll, pitch and yaw of such platform.

SUMMARY OF THE INVENTION (i) Aims of the Invention

A main object, therefore, of the present invention is to provide a mechanism that will provide a continuously horizontal or level platform, from which any device requiring horizontal levelling can operate, in "unstable" environments, e.g., on aircraft or on marine vessels.

Another object of the present invention is to provided a passive stabilization device to be used in unstable environments, e.g., at sea, where there is continuous lateral and angular motion.

A specific object of this invention is to provide a platform for communication antenna or radar when used on a boat.

Yet another object of this invention is to provide a device which is operative to maintain the orientation ("in space") of a platform which required a constant orientation on a ship (or other unstable environments), i.e., which will keep a platform horizontal (relative to gravity/or to the horizon) so that objects requiring stabilization could simply be attached to the platform of the stabilizer in order to maintain an orientation parallel to the horizon.

(ii) Statement of Invention

This is achieved, according to this invention, by using a fluid-bed system. Thus, according to the present invention, a passive stabilizing platform is provided comprising: a) a base; b) at least two (to compensate for roll) or three (to compensate for roll, pitch, yaw, vibration and acceleration), vertically-upright hollow legs equi-angularly disposed around the perimeter of the base, the hollow legs being adapted to contain a cylindrical column of liquid therein; c) tubular means interconnected the hollow legs to allow free movement of the liquid therebetween; d) a float member disposed in each such hollow leg, the float member being adapted to be in frictionally-sliding contact with the internal side walls of its associated hollow leg; e) a support arm fixed to each such float member and extending upwardly therefrom; and f) a platform supported by the support arm.

(iii) Other Features of the Invention

By one feature of this invention, the base is circular and three hollow legs are disposed 120° C. apart around the circumference of the base.

By another feature of this invention, the platform includes a joint interconnecting the legs and the platform to permit complete rotation of the platform in a vertical plane; and (ii) a counterweight hanging below the joint, whereby the combined center of gravity of the object on the platform and the counterweight is located at the center point of the joint, thereby to support large weights while only using small floats.

By one feature thereof, the joint is a gimbal, while in another feature thereof, the joint is an universal joint.

(iv) Generalized Description of the Invention

In more general terms, the basic principal of the stabilization mechanism is to provide a consistent horizontal reference platform, counteracting the effect of a moving reference or support, e.g., a ship or aircraft. The stabilization mechanism is designed to "center" around a horizontal position, or more specifically a plane tangential to the earth's surface (or perpendicular to the lines of gravity).

The main objectives of this invention were to provide a unique product, that met demanding criteria, namely, a device that would be equal to the demanding environment of a ship at sea, and at the same time would be simple in concept and inexpensive to construct.

The passive stabilizing device of this invention is just such a device. It is a device based on fundamental principles, and is unique in design. The design has allowed for affordability and functionality. The passive stabilizing device of this invention is based on a fluid-bed concept, which is effective and flexible The passive stabilizing device of this invention can accommodate various sizes and weights of antennae, and can also be easily adjustable in its response characteristics.

The antenna stabilizer of one embodiment of this invention is designed to operate in difficult environments, e.g., ships at sea, aircraft (large and small) and any other environment in which a stable, horizontal platform is difficult to maintain. This embodiment provides maximum flexibility and adaptability. It could easily be modified for application with devices/processes other than a satellite antenna.

BRIEF DESCRIPTION OF THE DRAWINGS

In the accompanying drawings.

Figure 1:
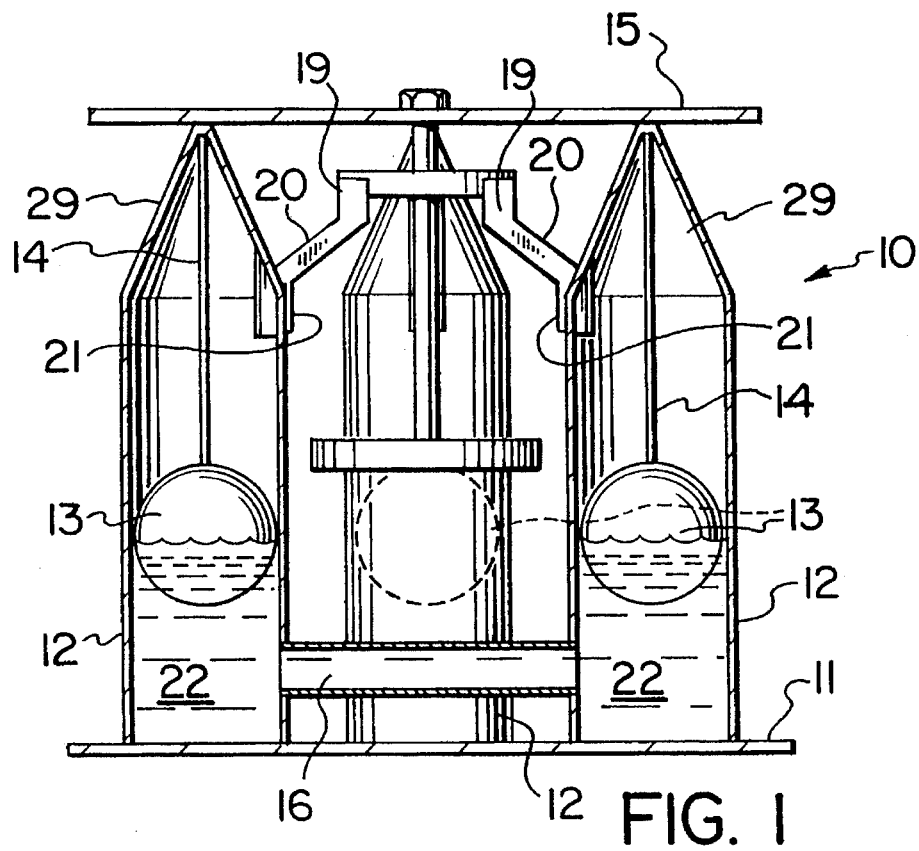
FIG. 1 is a central longitudinal section through one embodiment of the passive stabilizer of the present invention.
Figure 2:
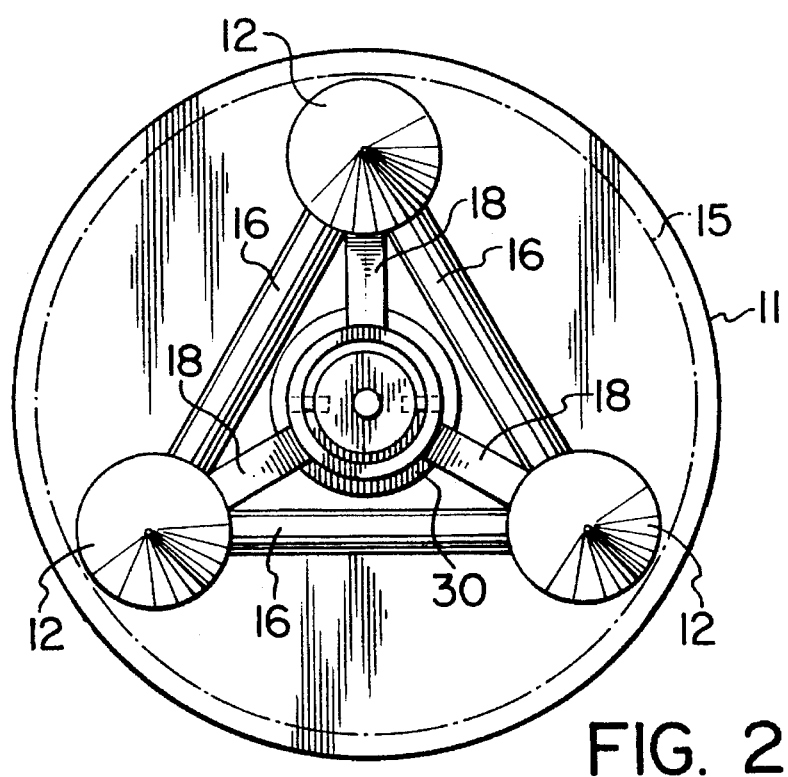
FIG. 2 is a transverse section through the embodiment of the stabilizer of the present invention of FIG. 1.
Figure 6:
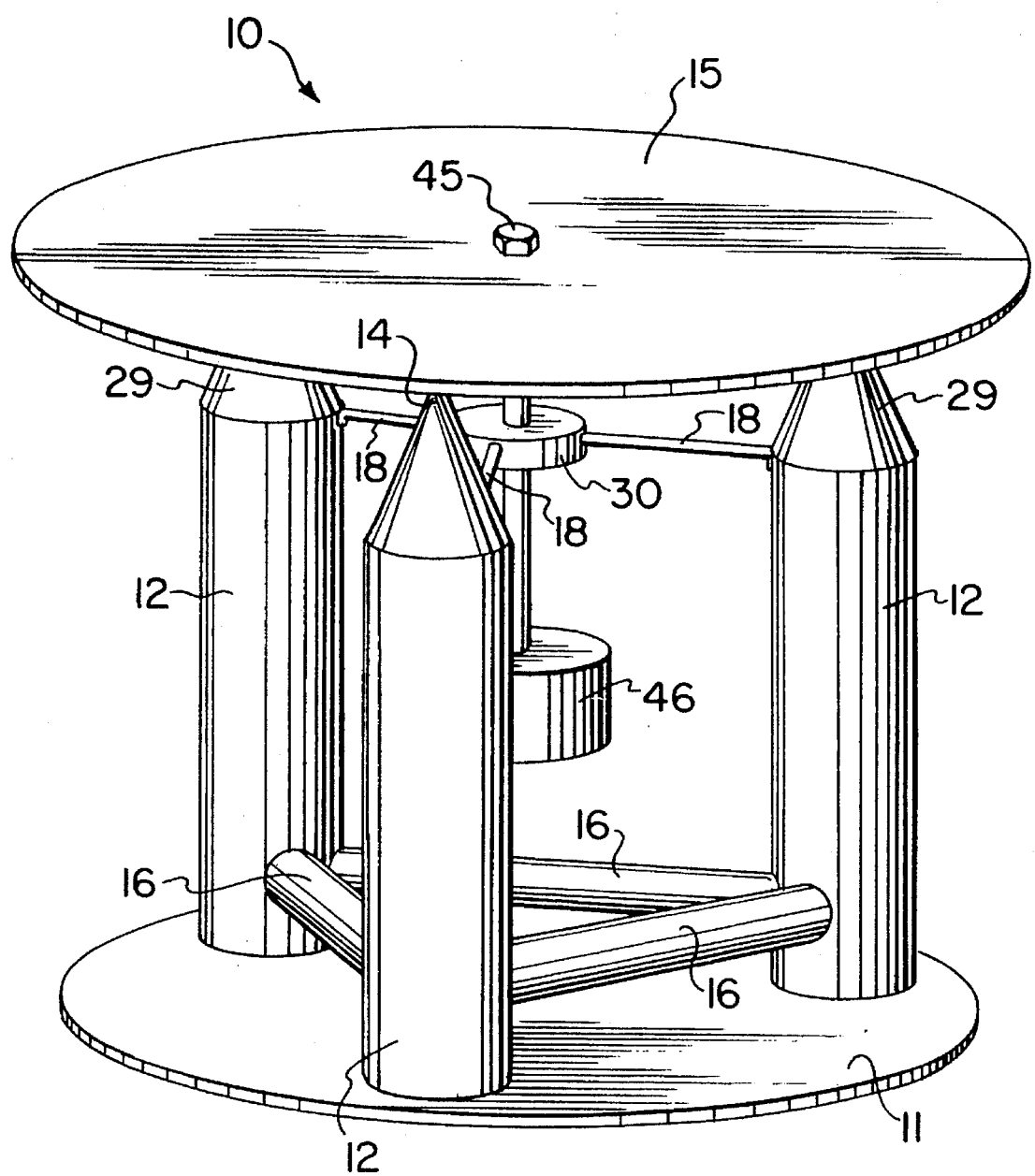
FIG. 6 is a perspective view of one embodiment of the passive stabilizer of the present invention.

DESCRIPTION OF PREFERRED EMBODIMENTS (i) Description of FIGS. 1, 2 and 6

As seen in FIGS. 1, 2 and 6, the passive stabilizer 10 of one embodiment of this invention, includes a base 11, which may be generally circular. Disposed equi-angularly around the base 11 are three hollow cylindrical legs 12. Within each hollow cylindrical leg 12 is a float assembly 13, each provided with an upstanding support arm 14, projecting through a conical lid 29, which arm 14 supports a platform 15. The hollow cylindrical legs 12 are adapted to contain a column of fluid 22 and are fluidically interconnected to each other. The hollow cylindrical legs 12 also support a pivot assembly 17 including a central gimbal 30, to be further described with reference to FIGS. 3 to 5. Gimbal 30 is connected to, and is supported by, each of the hollow cylindrical legs 12 by means of mount arms 18. Each mount arm has an inner vertical section 19 connected to the gimbal 30, an outwardly and downwardly-sloping middle section 20 and an outer vertical section 21 connected to the respective hollow cylindrical leg 12. The gimbal 30 is operatively associated with shaft 38 to be described hereinafter with respect to FIGS. 3 to 5.

Figure 3:
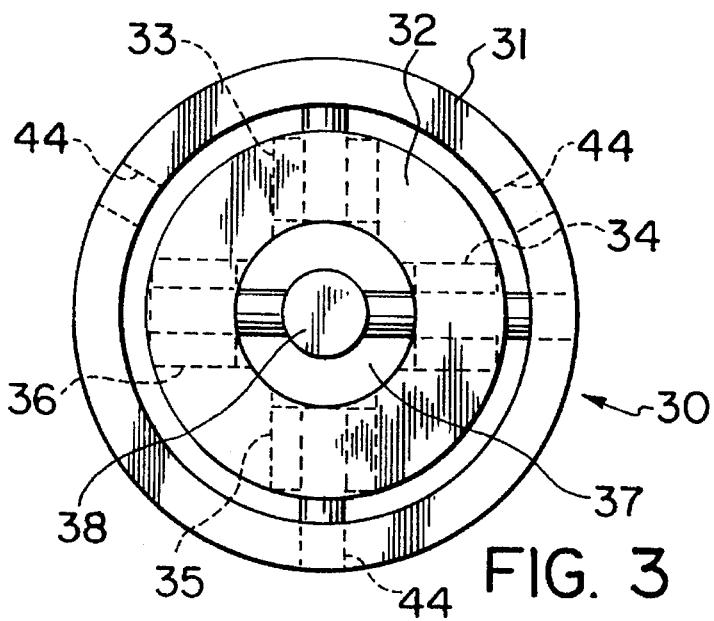
FIG. 3 is a top plan view of an auxiliary gimbal device forming part of the passive stabilizer of one embodiment of the present invention.
Figure 4:
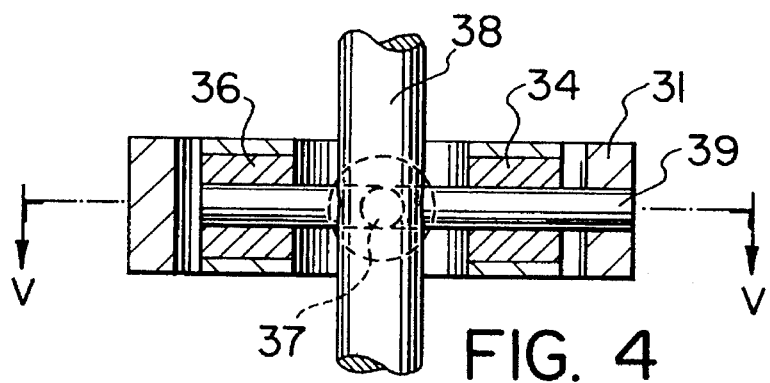
FIG. 4 is a central longitudinal section through the gimbal device of FIG. 3.
Figure 5:
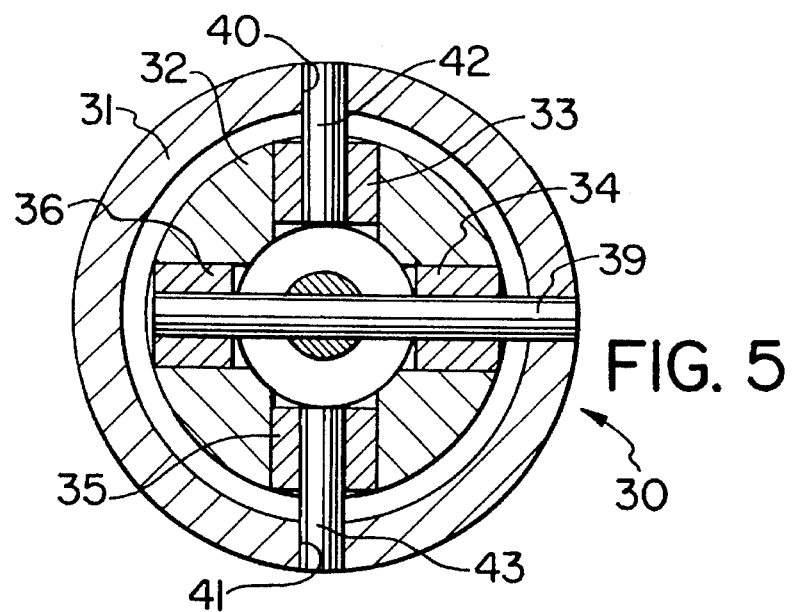
FIG. 5 is a section along the line V—V of FIG. 4.

(ii) Description of FIGS. 3, 4 and 5

As seen in FIGS. 3 to 5, the gimbal 30 includes an outer ring 31, e.g., of aluminum, and an inner ring 32, e.g., of aluminum. The inner ring 32 supports four bearings 33, 34, 35, 36. Within the core 37 of the inner ring 33 is a shaft 38 to provide auxiliary support to the gimbal 30. Shaft 38 is formed of nylon, and is hung from, and supported by the platform 15, by passing through a central aperture (not seen) in the platform 15 and held thereto by suitable means, e.g., nut 45. Shaft 38 also supports counterweight 46. An inner gimbal shaft 39 is rotatable in bearings 34, 36. The outer ring 31 includes shaft seals 40, 41. Within shaft seal 40 is an outer gimbal shaft 42, e.g., of polished hardened steel, the shaft 42 being rotatable in bearing 33. Within shaft seal 41 is an outer gimbal shaft 43, e.g., of polished hardened steel, the shaft 43 being rotatable in bearing 35.

Outer ring 31 is provided with three slots 44 to provide securement sites for the mount arms 18.

OPERATION OF PREFERRED EMBODIMENTS

In operation, the platform floats on a bed of fluid. The "bed" preferably consists of three vertical liquid-filled hollow cylindrical legs. Three hollow cylindrical legs provide an optimum stabilization for roll, pitch, yaw, vibration and acceleration. However, two hollow cylindrical legs would be sufficient for roll stability. Each hollow cylindrical leg is covered by a conical cap. The bottom of each hollow cylindrical leg is interconnected to each adjacent hollow cylindrical legs using three interconnecting tubes, which allow the flow of liquid from one leg to another. Each hollow cylindrical leg contains a float which is connected to the support platform. As the system of legs and interconnecting tubes moves with any rocking or rolling motion, the liquid level (and floats) will change in each hollow cylindrical leg. The "height" in space of liquid in each hollow cylindrical leg will always be equal and will be horizontal. Therefore the floats will always be maintained at the same height in space and hence maintain the horizontal orientation of the support platform.

In addition, the passive stabilizer platform of the present invention has been provided with means to support significant weight on the platform. This means comprises a gimbal or universal-type joint secured between the hollow cylindrical legs and the platform to allow for full swivel motion which provides for complete rotation in any vertical plane. A counterweight hangs below the joint such that the combined center of gravity of the object on the platform and the counterweight will be located at the center-point of the joint. This will allow for the support of relatively large weights while only using small floats.

CONCLUSION

Thus, it is seen that the passive stabilizing platform of this invention is useful for any device requiring stabilization. The passive stabilizing platform of preferred embodiments of this invention will keep a platform approximately level in the "X" and the "Y" axes at all times. The passive stabilizing platform of this invention will compensate for effects of rolls, pitches, yaws, vibrations, and accelerations simultaneously. The passive stabilizing platform of this invention is corrosion resistant and maintenance free.

The key components of the passive stabilizing platform of this invention are:

a minimum number of legs and individual floats to minimize the size, cost, and fluid volume in order to reduce swooshing and inertia of fluid; and the counterweight concept, which allows for use of small floats (with accordingly small buoyancy force) to stabilize any object with any weight (providing the legs and interconnects are accordingly adjusted).

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A passive stabilizing platform which comprises:

(a) a base;

(b) a platform;

(c) at least three vertically-upright hollow cylindrical legs, each of said legs having a lower end and an upper end, each of said legs being secured at the lower end thereof to said base, and being disposed equi-angularly around said base, wherein in use, each of said hollow cylindrical legs contains a cylindrical column of water therein;

(d) a plurality of hollow cylindrical tubes, two tubes being connected to each of said hollow cylindrical legs near the lower end of each of said hollow cylindrical legs thereby interconnecting said hollow cylindrical legs to each other to allow free unimpeded movement of water between said interconnected hollow cylindrical legs so that an upper surface of water in each of said hollow cylindrical legs automatically moves to an equilibrium level;

(e) a spherical float member disposed in each of said hollow cylindrical legs, said spherical float member being movable only vertically upwardly or vertically downwardly within the hollow cylindrical leg within which said spherical float member is disposed, said movement being dependent solely, and in conjunction with, said upper surface of water in the hollow cylindrical leg within which said float member is disposed;

(f) a plurality of support arms, each of said support arms having an upper end and a lower end, each of said support arms being fixed at said lower end to an associated said float member and extending upwardly from said associated float member and being fixed at said upper end to said platform, to cause rotation of said platform about a vertical axis upon vertical movement of said support arms;

(g) a joint secured between said hollow cylindrical legs and said platform to permit said complete rotation of said platform about a vertical axis;

(h) a depending vertical shaft rigidly secured to said platform; and (i) a counterweight hanging on said depending vertical shaft below said joint;

whereby said passive stabilizing platform compensates for the effects of rolls, pitches, yaws, vibrations and accelerations simultaneously, to keep said platform level in the "X" and "Y" axes at all times.

2. The platform of claim 1 wherein said joint is a universal joint.

3. The platform of claim 1 wherein said joint is a gimbal.

4. A passive stabilizing platform which comprises:

a) a base;

b) a platform;

c) at least three vertically-upright hollow cylindrical legs, each of said legs having a lower end and an upper end, each of said legs being secured at its lower end to said base, and being disposed equiangularly around the perimeter of said base, each of said hollow cylindrical legs being adapted to contain a cylindrical column of water therein;

d) a plurality of hollow cylindrical tubes, two tubes being connected to each of said hollow cylindrical legs the lower end of each of said hollow cylindrical legs for interconnecting said hollow cylindrical legs to each other to allow free unimpeded movement of water therebetween, so that the upper surface of water in each of said hollow cylindrical legs automatically moves to an equilibrium level;

e) a spherical float member disposed in each of said hollow cylindrical legs, each said spherical float member being in frictionally-sliding contact with the internal side walls of the hollow cylindrical leg within which said float member is disposed, each said float member being movable only vertically upwardly or vertically downwardly with respect to the hollow cylindrical leg within which said float member is disposed, dependent solely on the level of liquid in the hollow cylindrical leg within which said float member is disposed;

f) a plurality of support arms, each said support arm having an upper end and a lower end, each said support arm being fixed at its lower end to an associated said float member and extending upwardly therefrom; and being fixed at its upper end to said platform to cause rotation of said platform about a vertical axis upon vertical movement of said support arms;

g) a joint interconnecting said hollow cylindrical legs and said platform to permit said complete rotation of said platform about a vertical axis and h) a counterweight hanging below said joint whereby the combined center of gravity of an object supported on said platform and said counterweight is located at the center point of said joint, thereby to support large weights while only using small floats;

whereby tilting of said base with respect to the equilibrium level is translated to different automatic vertical movement of each of said floats within the hollow cylindrical leg within which said float is disposed, thereby automatically to maintain said platform at an equilibrium level.

* * * * *